Sept. 20, 1966 J. K. MOORE ET AL 3,274,581

IMAGE SCANNING APPARATUS

Filed March 28, 1963 4 Sheets-Sheet 1

INVENTORS.
JAMES KENNETH MOORE,
PETER C. GOLDMARK,
BY BERNARD R. LINDEN &
MARSHALL P. WILDER

Brumbaugh, Free, Graves & Donohue
their ATTORNEYS

INVENTORS.
JAMES KENNETH MOORE,
PETER C. GOLDMARK,
BY BERNARD R. LINDEN &
MARSHALL P. WILDER
Brumbaugh, Free, Graves & Donohue
their ATTORNEYS

IMAGE SCANNING APPARATUS

Filed March 28, 1963 4 Sheets-Sheet 3

INVENTORS.
JAMES KENNETH MOORE,
PETER C. GOLDMARK,
BERNARD R. LINDEN &
MARSHALL P. WILDER
BY Brumbaugh, Free, Graves & Donohue
their ATTORNEYS Sept. 20, 1966 J. K. MOORE ET AL 3,274,581

IMAGE SCANNING APPARATUS

Filed March 28, 1963 4 Sheets-Sheet 4

INVENTORS.
JAMES KENNETH MOORE,
PETER C. GOLDMARK,
BY BERNARD R. LINDEN &
MARSHALL P. WILDER

Brumbaugh, Free, Graves & Donohue their ATTORNEYS

United States Patent Office
3,274,581
Patented Sept. 20, 1966

3,274,581

IMAGE SCANNING APPARATUS

James Kenneth Moore and Peter C. Goldmark, Stamford, Bernard R. Linden, South Norwalk, and Marshall P. Wilder, Stamford, Conn., assignors to Columbia Broadcasting System, Inc., New York, N.Y., a corporation of New York Filed Mar. 28, 1963, Ser. No. 268,718
16 Claims. (Cl. 340—324)

This invention relates to apparatus for generating electrical signals representative of visual images, and more particularly to means for selectively deriving electrical signals suitable for use in a high resolution display device, from a group or font of available visual images.

In many areas of information processing and transmitting, the ability to develop electrical signals representative of individual ones of a group of indicia is a necessary prerequisite to successful operation of the system. Memory devices, for example, require that individual bits of data be selectively read out and supplied in the form of electrical signals to the data processing machinery with which they are associated. An analogous capability is necessary in read-out devices for computer systems, where for example, digital signals from the computer must be converted into some form suitable for human interpretation. In both cases, it may be desirable that the signals representing the selected indicia be of such a form that a visual representation can be generating therefrom, e.g. on a cathode ray tube. Of course, where it is desired to transform a visual image such as a map or illustration, into electrical signals for transmission to a remote point, the signals must be of a nature to permit ready reproduction of the image at the reception point.

It is the principal object of the present invention to provide improved apparatus for deriving electrical signals representative of a visual image.

A further object of the invention is to provide such apparatus wherein the derived electrical signals are in a form to permit ready visual reproduction of the image on a display device.

An additional object of the invention is to provide improved apparatus for deriving electrical signals representative of any type of visual image, in such form as to permit faithful reproduction of the image on a display device.

Still another object of the invention is to provide improved image converting apparatus suitable for use in output equipment of a data processing system.

Although, as will be obvious, the basic apparatus of the present invention has application in varied fields, for purpose of example it will be described herein as used in a digital computer output arrangement capable of providing visual outputs directly usable for phototypesetting purposes. The general structure and principles of operation of the invention will, of course, remain the same no matter what the precise environment in which it is used, and the example to be described hereinbelow will serve to demonstrate its novel features in a practical system.

Electronic data processing technology has developed to a point where vast amounts of information can be compiled and made available in a relatively short time. However, there are at present no means for converting these signals into visually interpretable forms at speeds commensurate with those of the generation of the data. It is the present practice to provide some type of buffer storage means between the data processing equipment and the output or reproducing device, to accommodate the differences in speed of operation. The output device, which in many applications may be a mechanical printer or a cathode ray tube display unit, for example, may then proceed to provide visual representations of the electronic signals at a pace independent of their speed of generation.

From a graphic arts point of view, presently known mechanical and electronic printers produce relatively poor copy and provide a printed page lacking in clarity and crispness. Moreover, many of the presently available devices provide a stylized form of print, necessitated by the nature of the printing mechanism itself, and are also severely limited as to page format and flexibility. These factors prevent direct use of the printer output for production of a plate or master for use with commercial printing techniques. The information on the printed sheets must be transcribed into suitable form for reproduction, which is expensive both of time and effort, and during which process the accuracy of the computer generated data is subject to human error.

Cathode ray tube output systems are available which are capable of recording computer output data directly on film, which may in turn be used to produce a plate or master for printing purposes. However, these systems are inherently too limited in flexibility to enable production of printing masters of high resolution and aesthetic appeal.

In the printing, or graphic art industry, the quality of the plate or master used in the printing process will vary with the type of document to be printed. In certain cases, the quality of the final product may be sacrificed to some extent in favor of cost or speed of production, while in other instances, such as where pictures or special characters are to be produced, greater resolution may be required. Accordingly, to be most useful for typesetting purposes, the computer output device must not only be able to reproduce characters with sufficient resolution, but it must be able to vary the resolution in accordance with the printer's needs. For complete versatility, it must also be capable of reproducing both pictures and type characters, and of readily changing the type fonts, to vary the format of the printed page as desired. The present invention provides all of these desirable features.

It has been found that a raster line type of representation on the face of the cathode ray tube is capable, in a properly designed system, of visually reproducing a type character with sufficient resolution for substantially all printing purposes. In this type of representation, each character is formed by intensity modulation of the electron beam as it makes successive scans across the face of the tube to generate an individual sub-raster for the character. If the sweep or scan frequency is made high enough, the portions of the character on successive scan lines will be sufficiently close to each other to effectively merge into one another and form a solid image of high resolution.

Cathode ray tubes are available which are capable of being accurately controlled and of producing finely detailed images. Relating printing quality to the raster line type of representation on the face of the cathode ray tube, it has been determined that an individual character may be produced with a resolution adequate for phototypesetting purposes (ten to twenty optical line pairs per millimeter) within a range of approximately 500 to 1500 scan lines per inch.

In accordance with the invention, a novel character generating apparatus is provided including means for directing an illuminated image of a readily changeable font of characters on a photocathode, which in turn generates an electron image thereof. The electron image is accelerated towards an anode provided with an aperture for each character of the electron image, the apertures being considerably smaller than the respective electron images of the individual characters. Scanning means deflect the entire electron image, both horizontally and vertically across the apertures, the extent of the scan being just slightly greater than the size of the electron image of an individual character. Selecting means responsive to digital signals from the data processing apparatus determine which of the apertures will permit the passage of electrons therethrough.

The electrons passing through the selected aperture generate video signals in accordance with the scanning motion which, after amplification, are applied to the intensity grid of a cathode ray tube whose beam deflection is synchronized with that of the scanning control for the electron image. An independent positioning signal, such as from the data processing apparatus, determines the precise location on the cathode ray tube face at which the selected character is to be reproduced. To make up a page for example, the characters are selected one at a time in the order in which they are to be printed, as determined by control of the output of the data processing apparatus, and reproduced on the face of the cathode ray tube in a pattern established by the positioning signals. The entire page is displayed on the face of the cathode ray tube and photographed in accordance with known techniques to fabricate the printing plate or master. The entire process takes a relatively short time for each page and is adaptable to many different variations both in format of page make-up and in style or type and content.

The foregoing and other objects, features, and advantages of the present invention will become more apparent from the following detailed description thereof when taken in conjunction with the accompanying drawings, in which.

Figure 1:
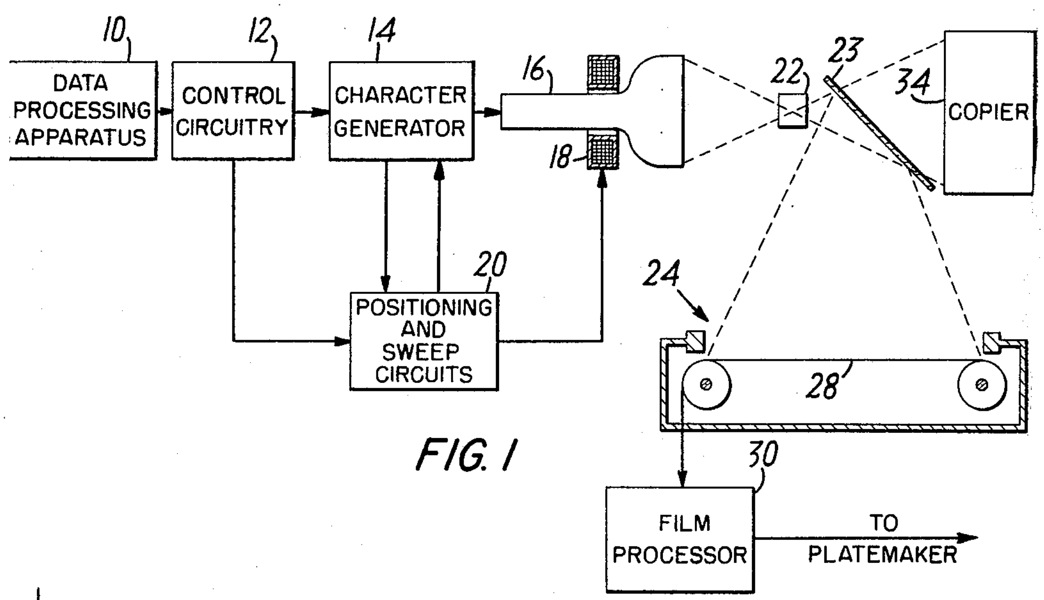
FIGURE 1 is a block diagram of a data processing output arrangement incorporating the character generating system of the invention.

A simplified block diagram illustrating the overall arrangement of the system according to the present invention is shown in FIGURE 1. In the description to follow, it will be assumed that the apparatus is being used to produce a page of text material, although its use is obviously not limited thereto. The data processing system or computer generating the information to be displayed is illustrated at 10. In conventional manner, the output signals may be coded in any of the well known digital code forms to represent the individual letters and numbers of the text material to be reproduced. These signals are supplied to the input of the typesetter control circuitry 12.

The control circuitry functions to decode the digital signals from the data processing apparatus 10 into a suitable form for actuation of the typesetting apparatus, and also to provide signals in synchronism therewith for setting up the desired page pattern on the face of the display device. Conveniently, the control circuitry 12 may include a magnetic tape unit, or other storage medium, for recording the translated information signals from the computer and providing the input to the subsequent character generating apparatus. As will be seen hereinafter, the individual letters to be displayed, for example, are selected one at a time by coincident selection means responsive to a pair of simultaneously applied digital signals. The translation of the computer output signals into the digital selecting signals may be accomplished by any suitable means, such as manually controlled patch boards or any of a variety of electronic decoding circuits. As is well known, decoding means are presently available to enable the apparatus to accept the signals of a wide variety of different data processing arrangements and translate them into suitable form for application to the character generator 14.

The control circuitry 12 includes a logic section which enables the digital signals available at the data processing output, to be arranged in proper order to produce the desired output page format. Conventional output computer signals include provision for spaces, punctuation, etc., and the logic circuitry is capable of directing the positioning and sweep circuits 20, and in turn the character generating device 14, to begin a new line after any predetermined number of signals to present the information as a full printed page, or in columnar form, etc., as desired.

The signal output of the control circuitry corresponding to the characters to be displayed are supplied to the character generator 14. This apparatus will be described in detail hereinafter and for present purposes, it is sufficient to state that the character generator accepts the signals from the control circuitry and provides at its output a video form which is supplied to the intensity grid of a high resolution cathode ray tube 16. These signals, in combination with the cathode ray tube sweep signals, produce on the face of the tube visual images of the characters to be printed in the desired page format.

The positioning and sweep circuits 20 provide horizontal and vertical scanning signals for the cathode ray tube 16, which may be of conventional design. These signals are supplied to the deflection yoke 18 on the cathode ray tube to deflect the beam in a manner similar to a television scan, but over only a small portion of the tube face at a time. If desired, of course, the tube 16 may be of the electrostatic type and the sweep signals will be applied to the deflecting plates thereof.

In addition to providing the sweep signals, the circuits 20 establish the positioning of the individual character on the face of the cathode ray tube. This is accomplished by superimposing the horizontal and vertical sweep signals on predetermined voltage bias levels which establish the starting position of the electron beam of the tube. The positioning biases will, of course, be changed for each character to be displayed on the face of the tube, and control of these biases can therefore determine the page layout or format to be displayed. As indicated by the arrows in the figures, the positioning circuits 20 also receive signals from the character generator 14. As will be explained more fully below, these signals are indicative of the relative size of the individual characters and also indicate the completion of each character. The circuits 20 adjust in response to these signals to maintain proper spacing and format.

A high quality lens system 22 focuses the visual display on the face of the cathode ray tube onto both a camera indicated generally at 24 and a simpler visual recording device 34. The latter, which may be of any suitable electrophotographic type for producing a readable copy in a relatively short time, enables the information to be made immediately available for proofreading and checking, or for other purposes requiring relatively few copies of lower quality.

The recording camera 24 may be of a relatively rudimentary type. No shutter is required since the exposure is controlled by the characters themselves as they are generated on the face of the cathode ray tube. A mirror arrangement 23 deflects the image from the output of the lens 22 onto the film strip 28. The advance of the latter is controlled in synchronism with the operation of the character generating apparatus to maintain the film stationary for the duration of the generation of a complete page on the face of the cathode ray tube. Prior to the beginning of the subsequent page, the film strip is advanced a fixed length to present an unexposed portion for the new information. The exposed film may be supplied directly to an automatic film processor, if desired, for immediate developing, in known manner, after which it is sent to the plate maker to begin the printing process. The cathode ray tube face is suitably shielded against ambient light to prevent unwanted exposure of the film 28.

Figure 2A:
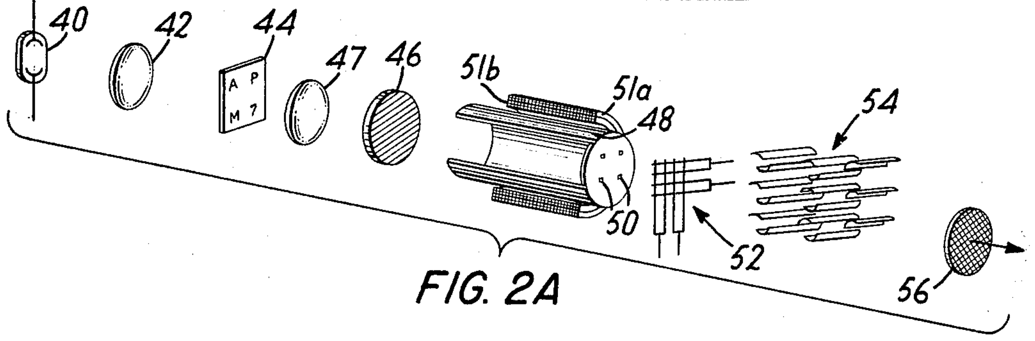
FIGURE 2A is an exploded view, in partial section, of the basic elements of the character generating device forming a part of the system of FIGURE 1.
Figure 2B:
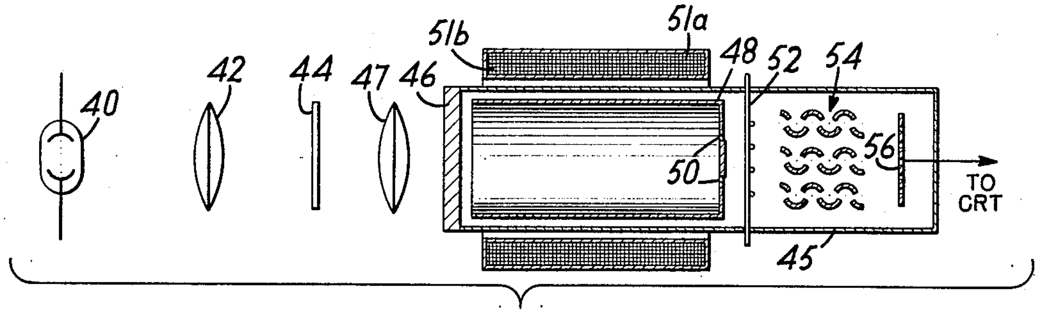
FIGURES 2B is a cross-sectional view in assembled form of the device of FIGURE 2A.

The high resolution, density, and speed of the character representation provided by the present invention is made possible by a novel character generator 14. The device, simplified for explanatory purposes, is illustrated in FIGURES 2A and 2B. Basically, it comprises a light source 40, which through a collimating lens system 42, illuminates a matrix 44 on which is imprinted a font of characters of the form desired for the text material to be reproduced. In a preferred form, the matrix is a photographic negative which is relatively opaque except for the characters imprinted thereon. The light image of the font of characters transmitted by the matrix 44 is directed through an imaging lens 47, or by fiber optics, against one surface of a photocathodic element 46 which produces at its opposite surface a corresponding electron image of the character font.

The electron image is accelerated by the accelerating anode 48 to the end plate thereof which is provided with a plurality of apertures 50, one corresponding to each of the characters on the matrix 44. The apertures are preferably rectangular in shape and considerably smaller than the electron image of its associated character. In practice, these apertures are in the order of from .005 inch to .0005 inch, depending on the size of the characters on the photocathode and the maximum desired resolution. The integrity of the electron image as it passes down the length of the accelerating anode is maintained by means of focusing coils **51*a* encircling the anode. The coils 51*b*** perform a deflecting function, as will be described hereinbelow.

Immediately forward of the aperture plate 50 is disposed a selecting grid indicated generally at 52. As shown, the grid may be comprised of a plurality of orthogonally related fine wires divided into pairs. Each pair is connected to a single output terminal and the intersection of two of the pairs produces a generally rectangular area aligned with one of the apertures 50. With the four-character matrix shown in the example, a 2 x 2 selecting grid having four intersections is provided. Other constructions of the grid may of course be used, e.g., perforated metal strips.

As will be discussed further hereinafter, application of suitable potentials to the respective wires of the selecting grid permits the electrons from the selected image to pass through the corresponding aperture 50 and the selecting grid 52 to the first dynode of an electron multiplier 54. The multiplier shown is of the "venetian blind" type but any suitable form may be used that will provide the requisite electron multiplication for electrons incident from any aperture. The output of the multiplier is collected at the anode 56 to provide a video signal amplitude modulated in accordance with the electron image selected by the grid 52.

Although not shown in FIGURES 2A and 2B, it will be realized that suitable operating potentials will be supplied to the photocathode 46, the accelerating anode 48, and the output electrode 56, to establish electron flow in the proper direction. Thus the accelerating anode will be at a positive potential with respect to the photocathode, but will be at a negative level with respect to the electrode 56. In a practical embodiment, the accelerating anode 48, to which electrons not permitted to pass through the grid 52 are returned, may be at ground potential, and the photocathode 46 and electrode 56 respectively at negative and positive potential levels. Alternatively, the photocathode 46 may be at ground potential and the anode 48 and the electrode 56 appropriately biased with respect thereto.

The electron emitting surface of the photocathode 46, the anode 48, selecting grid 52, multiplier 54, and electrode 56 are all enclosed in an evacuated chamber within the envelope 45, conveniently made of glass. The coils **51*a* and 51*b* may be mounted directly on the peripheral surface of the envelope and suitable connections for the wires of the grid 52 and the output lead from the electrode 56** are provided.

Figure 3A:
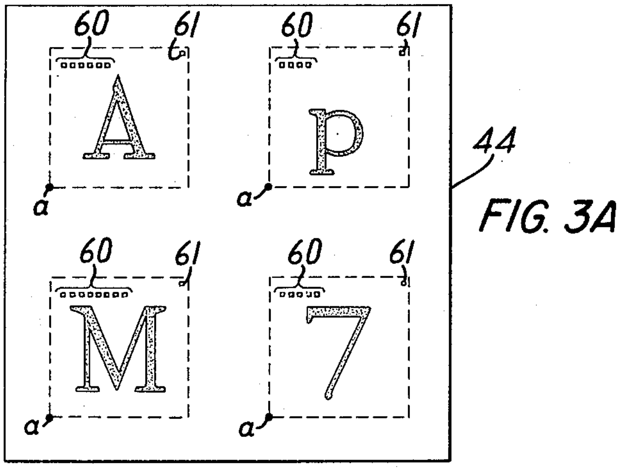
FIGURE 3A illustrates a sample character matrix usable in the device of FIGURES 2A and 2B.
Figure 3B:
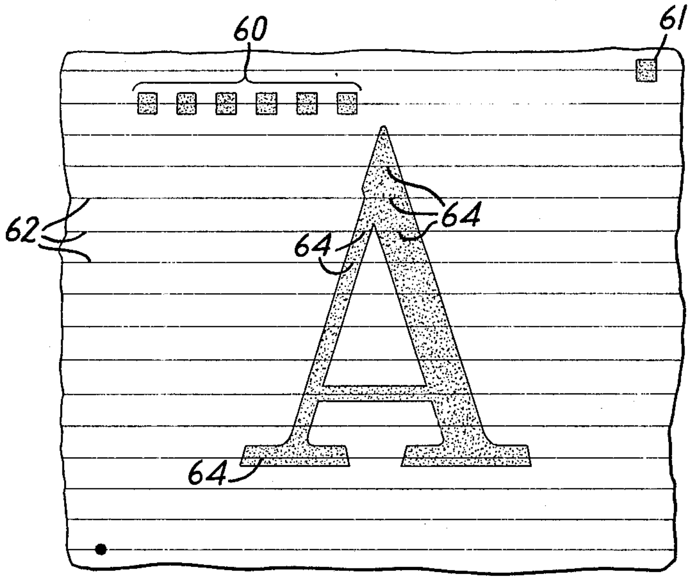
FIGURE 3B is an enlarged view of a single character on the matrix useful in explaining the operation of the character generating device.
Figure 3C:
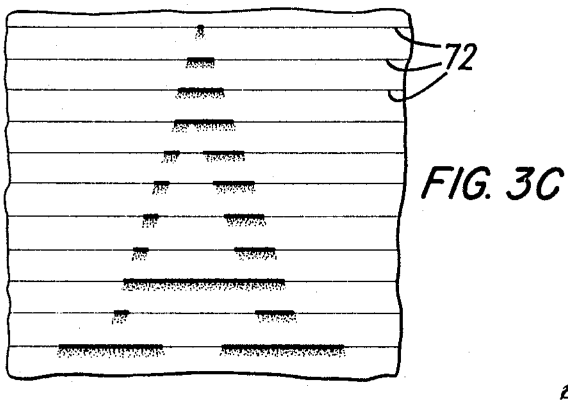
FIGURE 3C illustrates the formation of a single character on the face of the display device in accordance with the raster scan technique utilized in the present invention.

Turning now to FIGURES 3A, 3B and 3C, the raster scan technique employed in the present invention to generate the characters will be explained. FIGURE 3A is an enlargement of the matrix 44 illustrated in FIGURES 2A, 2B. Four different characters, representative of an aesthetically pleasing type font often used in printed works, are shown thereon. The character "A," for example, is composed of several segments of different widths and includes serifs at the lower ends of the segments.

The dotted rectangle surrounding each of the characters in FIGURE 3A defines the scanning area required to produce a video signal representative of a single character from its electron image. As the electron images of all of the characters on the matrix 44 are simultaneously accelerated towards the aperture plate of the accelerating anode 48, horizontal and vertical deflection potentials are applied to the coil **51*b*. With one aperture 50 provided for each character image, the entire electron image need be deflected only over an area encompassing a single character, as indicated by the dotted rectangles in FIGURE 3A, to provide electron streams through the respective apertures 50 representing all of the characters on the matrix 44**. As a result, large area scans are avoided and distortion of the characters minimized.

At the commencement of a scanning cycle, the positioning bias potentials on the coils **51*b* are adjusted to orient the electron image such that the apertures 50** are disposed opposite the lower left hand corners of the respective scanning areas, shown as the points *a* on the dotted rectangles in FIGURE 3A. The horizontal sweep may be effected by a conventional saw-tooth or trapezoidal wave form whereby the electron image is deflected horizontally with respect to the apertures 50 at a constant rate across the scanning areas. The vertical scan, however, is more suitably provided by a wave form of staircase shape. This enables the horizontal scanning lines to be closer to the true horizontal than is possible with a vertical sweep of saw-tooth shape and also simplifies synchronization problems. Distortion of the character is thereby reduced.

Referring now to FIGURE 3B which is an enlargement of the character "A" on the matrix 44, the scanning action commences with the associated aperture 50 positioned opposite point *a* on the electron image of the character. The horizontal and vertical scanning potentials sweep the electron image past the aperture in a series of substantially horizontal sweep lines 62. Where no portion of the electron image is encountered by the aperture, no electron flow therethrough occurs and consequently no electron stream is directed towards the selecting grids 52. However, when a portion of the electron image of the character sweeps past the aperture, an electron flow corresponding thereto occurs. Thus, during the portions of the horizontal sweep such as indicated by the numeral 64 in FIGURE 3B, electrons will flow through the associated aperture 50 in the end plate of the accelerating anode.

As noted hereinabove, the electron images corresponding to all of the characters on the matrix 44 will be swept simultaneously across their corresponding apertures 50, thereby producing a plurality of electron streams corresponding to their respective characters. The selecting grid 52 enables the characters to be selected one at a time in any order desired. Initially, the potential applied to each of the wires of the grid 52 is sufficiently negative to repel at each intersection the electrons coming through the corresponding aperture. These electrons are returned to the accelerating anode where they are collected and no video signal output is produced by the character generator.

To select the desired character, the potentials on one horizontal grid wire and one vertical grid wire are each increased to a value such that the net electric filed produced at their intersection will allow the fast moving electrons coming through the aperture corresponding to the grid intersection to pass through the grid in the electron multiplier 54. Selecting potential applied to a single wire is insufficient to permit electron flow through the grid, and coincident potentials are required. Only one pair of intersecting grids are activated at one time and the characters are generated sequentially in the order determined by the computer output.

The electron flow is multiplied in the electron multiplier 54 which provides at the anode 56 a complex amplitude modulated current corresponding to the character to be generated on the screen of the display device. The complex wave form is coupled, preferably after one or more stages of amplification, to the intensity grid of the cathode ray tube 16 (FIGURE 1).

Creation of the selected character in visual form on the face of the cathode ray tube is accomplished by sweeping the electron beam of the cathode ray tube in a manner directly proportional to the scanning action employed in the character generator. Utilizing the same saw-tooth or trapezoidal horizontal sweep and staircase vertical sweep in the cathode ray tube as in the character generator, the electron beam thereof is caused to scan across the desired portion of the face of the tube on which the character is to be developed to provide a raster corresponding to the scanning area employed in the character generator to derive the character signals. Thus, the character "A," FIGURE 3B, is scanned in the character generator within a given number of scan lines 62, and the reproduction of the character on the cathode ray tube face is accomplished within a like number of scan lines 72 (FIGURE 3C). It will be realized that the scanning wave forms will be the same in both the character generator and the cathode ray tube, and the size of the displayed character may be adjusted by varying the scale factor therebetween.

The scanning cycle in the cathode ray tube is synchronized with that of the character generator to begin the raster at the lower left corner, corresponding to point *a* in FIGURES 3A and 3B, and each scan line 72 of the raster will correspond to a scan line 62 of the character generator. The intensity modulation of the cathode ray tube in accordance with the complex wave form developed by the character generator will then recreate the character on the face of the cathode ray tube in the form of a plurality of closely spaced, parallel illuminated segments, as illustrated in FIGURE 3C. It will be understood, of course, that both FIGURES 3B tnd 3C are greatly enlarged, and when reproducing a character of typewriter size on the face of the cathode ray tube within one hundred scanning lines for example, the parallel segments thereof will effectively merge to from a solid character. It has been found that this effect is sufficient to produce characters of sufficient quality and resolution for graphic arts purposes.

To enable proper synchronization of the cathode ray tube sweep with that of the character generator apparatus, and to insure proper spacing of the characters on the face of the cathode ray tube, additional indicia may be provided on the matrix for each of the characters available thereon. These are indicated in FIGURES 3A and 3B by a series of dots above the character but within the scanning frame, which produces an output signal from the character generator in digital form. These indicia 60 may be coded, for example in binary form, to provide information with respect to the width of the character in relation to other characters in the type font, the relative height of the character, etc. The signals therefrom are fed back to the positioning and sweep circuits 20 (FIGURE 1) to control the starting point *a* of the scan of the succeeding character as well as the magnitudes of the horizontal and vertical sweeps. The latter may be effected by any suitable form of amplitude control of the horizontal and vertical sweep generators.

Similarly, a "character completed" indicia 61 is provided at the conclusion of the scan to provide a signal to the positioning apparatus that the character has been completed and to adjust the scanning apparatus to begin the generation of the succeeding character. As will be apparent, these control indicia may take varied forms and may be used to effect different control functions on the sweep and positioning circuitry. If desired, further coded indicia (not shown) may be provided for checking purposes. For example, a binary coded representation of the selected character may be included to generate signals which can be used to verify the accuracy of the equipment.

It will be understood that suitable blanking controls will be applied to the cathode ray tube to insure that the control indicia are not reproduced on the tube face. This will be discussed further hereinafter.

The apparatus illustrated in FIGURES 2A and 2B has been limited to a four-character matrix, for explanatory purposes, and it will be realized that as a practical matter, a larger number of available characters will be necessary. In one embodiment, utilized for phototypesetting of straight textural material, a character matrix having 256 separate characters thereon has been found to be suitable. This allows for upper and lower case alphabets, numerals, and punctuation, of several type fonts. In such an arrangement, the apertures 50 are made .001 inch square, enabling 250 overlapping horizontal scan lines for a maximum character size of 0.15 inch. These parameters allow high quality to be achieved for characters up to 18 points in size.

Figure 4:
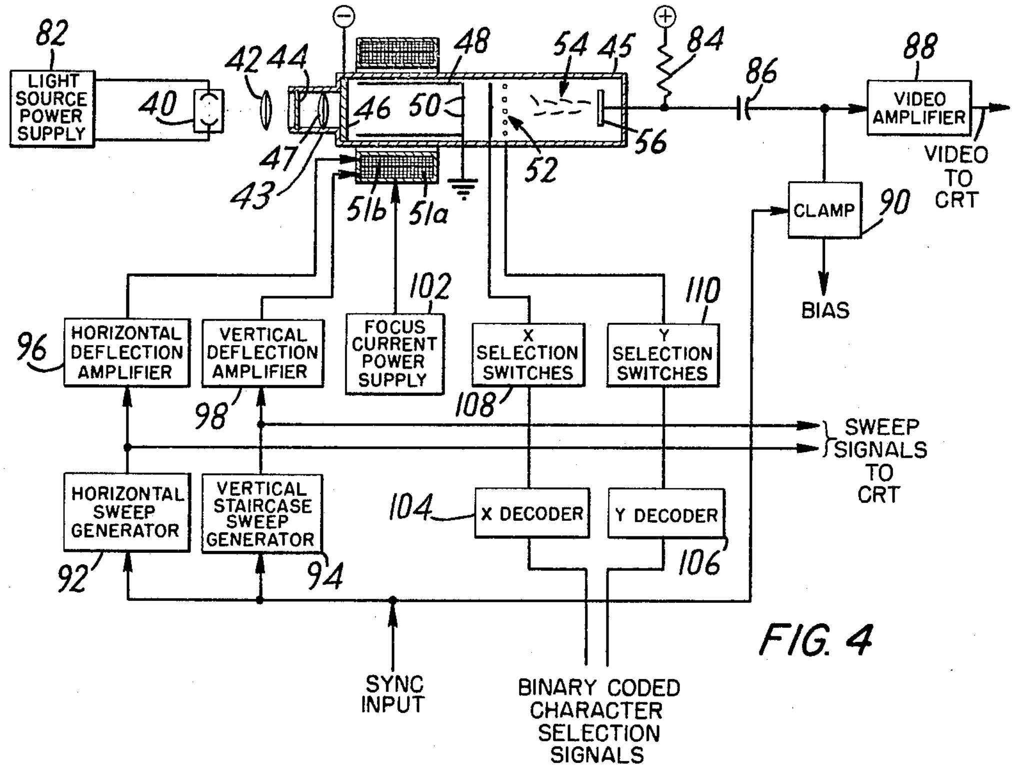
FIGURE 4 is a block diagram of the basic sweep and control circuitry used with the character generating device of the invention.

The sweep and selection circuitry for the apparatus of FIGURES 2A and 2B is illustrated in block form in FIGURE 4. The light source power supply 82 supplies the energy for the light source 40, which may be an arc lamp, and which, through the collimating lens arrangement 42 (or fiber optics) illuminates the character matrix 44 on the character generating device. The character matrix, and an imaging lens 47, are preferably mounted in a slide arrangement 43 formed at one end of the glass envelope 45 of the character generating apparatus, outside of the evacuated chamber. This enables different character fonts to be readily interchanged with a minimum of disturbance of the operation of the system. The remainder of the character generating device is substantially the same as that shown in FIGURES 2B, except for some minor simplification in the drawing for purposes of clarity. The end plate of the accelerating anode 48 is provided with a suitable number of apertures 50 corresponding to the number of characters on the matrix 44. Similarly, the selecting grids 52 are arranged to provide one intersection for each aperture 50.

The output of the character generating device is applied across the load resistor 84 and through coupling capacitor 86 to the input of the video amplifier 88 which supplies the signal to the intensity grid of the cathode ray tube. A clamping arrangement 90 at the input of the video amplifier 88 provides a constant "black" signal level for the cathode ray tube display and allows blanking of the tube during retrace intervals.

The vertical and horizontal sweep voltage for both the character generating device and the cathode ray tube display tube are provided by the sweep generator 92 and staircase (or step wave) sweep generator 94, respectively. Synchronizing signals, such as those generated when the character scan reaches the "end of character" indicia 61 (FIGURE 3B), are applied to the horizontal and vertical sweep generators 92, 94, to simultaneously initiate a new sweep cycle. The sawtooth and step wave forms therefrom are amplified in horizontal and vertical deflection amplifiers 96, 98, respectively, and applied to the coils 51*b* on the character generating device. Focusing current, to maintain the integrity of the electron image traversing the character generating device, is supplied to the coils 51*a*, from source 102.

In accordance with the foregoing discussion, one aperture 50 is provided for each character on the matrix 44, and the characters are scanned simply by deflecting the electron image of the entire font of characters horizontally and vertically in amounts corresponding substantially to the width and height of a single character. The extents of the sweeps are small fractions of the diameter of the character generating device itself, and the deflection distortion of the signals is therefore held to a minimum.

Suitable D.C. biasing potentials are supplied to the character generator to accelerate the electron image towards the apertured end plate of the anode 48. As shown, the anode 48 is grounded and a negative potential source is coupled to the photocathode 46. Positive potential is coupled to the electrode 56 through resistor 84.

Digital character signals from the data processing apparatus 10 are supplied to a pair of decoders 104, 106 which are associated with the vertical and horizontal, or X and Y, grid wires, respectively, of the selecting grid 52. These decoders, which for example may be of the diode matrix type, convert the digital character signals to a suitable form for operating the X and Y selection switches 108, 110 respectively. The latter in turn select the pair of intersecting grid wires corresponding to the letter or character in the matrix 44 to be reproduced. The decoders 104, 106 and selection switches 108, 110 form part of the control circuitry 12 of FIGURE 1, and as will be apparent, are preset to conform to the particular character matrix 44 then being used.

As indicated in FIGURE 4, the outputs of the horizontal and vertical sweep generators 92, 94, are also supplied to the cathode ray tube sweep circuitry to insure exact synchronism between the character generating device and the display device. The synchronizing signal is also supplied to the clamp 90 to provide a blanking signal during the retrace cycle of the sweep circuits, in conventional manner. It will be understood that the blanking interval is adjusted to include that portion of the scanning cycle during which the indicia 60 and 61 are being scanned, so that they are not reproduced on the screen of the tube.

It will be realized that all of the control circuitry 12 of FIGURE 1 is not illustrated in FIGURE 4, only those elements necessary for understanding of the operation of the character generating apparatus being incorporated therein. Likewise, conventional elements such as power supplies for the various circuit units have been omitted from the drawing.

Figure 5:
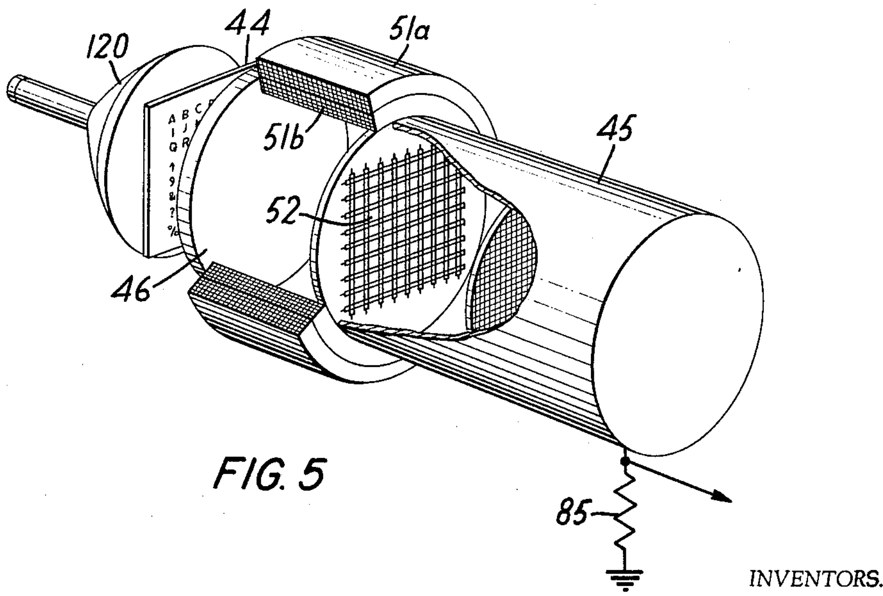
FIGURE 5 is a cutaway perspective view of a character generating device according to the invention illustrating an alternate way of illuminating the character matrix.

The character generating device illustrated in FIGURES 2A, 2B and 4 is of the cold cathode type. Accordingly, the photocathode 46 will have a life of considerable length, even though it is maintained constantly exicted by the light source 40. The life of the photocathode may be even further extended with the alternate structure shown in FIGURE 5, in which illumination of the matrix 44 is effected by means of a cathode ray tube 120. The matrix is mounted substantially in contact with the face of the tube 120 and immediately behind the photocathode 46.

The beam generating apparatus of the cathode ray ube 120 is adjusted to produce a light spot on the face of the tube slightly larger than each of the characters on the matrix, which is shown to have 8×8, or 64 characters. Deflection of the beam is synchronized with the operation of the selecting grid 52, whereby only the character to be selected is illuminated. It is to be understood that the cathode ray tube 120 does not perform the selection function but merely serves as a means to limit the illumination of the photocathode 46 to a relatively small area corresponding to the character then being generated. The actual selection is accomplished, as in the previously discussed embodiments, by the selecting grid 52. Therefore, there is no necessity for the size of the electron beam or its positioning to be precisely controlled. It is sufficient merely that the beam spot be sufficiently large to encompass a character on the matrix and no adverse effects result if adjacent characters are partially illuminated as well.

Figures 6, 7:
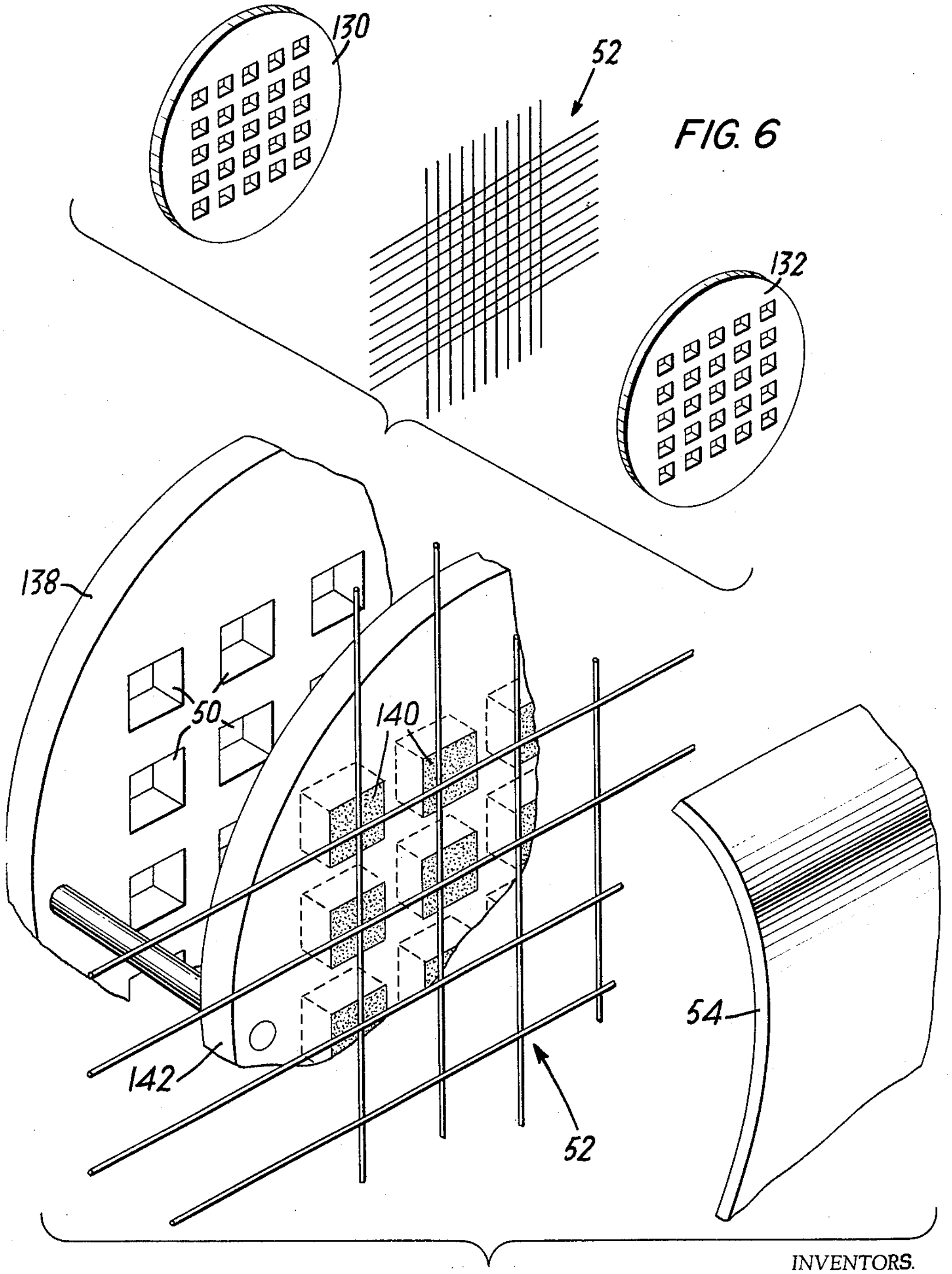
FIGURES 6 and 7 are respectively different modifications of aperture plate-selection grid structure usable in the character generating device.

Alternate forms of character selecting arrangements are shown in FIGURES 6 and 7. The arrangement of FIGURE 6 utilizes a pair of separated aperture plates 130, 132 having the desired number of apertures therein, with each aperture on one of the plates being aligned with an aperture in the other plate. The selecting grid 52 is interposed therebetween with the intersections thereof disposed between the pairs of aligned apertures in the plates 130, 132. In operation, electrons from the scanned image will pass through the apertures in the plate 130 and into the area of the grid 52. The voltages normally applied to each of the X and Y selection lines of the grid 52 are of magnitudes and polarities to deflect the electron streams traversing the grid by an amount sufficient to insure that they do not pass through the corresponding aperture in the plate 132. The potentials applied to the grid wires to select a character to be displayed counteract these voltages and leave the electron beam substantially undeflected, whereby it passes through the aperture in plate 132. With this arrangement, selection is accomplished with selecting potentials of relatively small magitudes, without sacrificing accuracy. If desired, apertures in the plates 130 and 132 may be displaced in alignment by a fixed amount and the electron stream corresponding to the character to be selected deflected by the selection voltages to pass through the aperture in the plate 132. The apertures in plate 132 may be larger than those in plate 130 since they do not scan the character or contribute to resolution.

Another way of reducing the selecting voltages required is shown in FIGURE 7. In this modification, the electrons passing through the apertures 50 in the end plate 138 of the anode 48 are intercepted by respective thin layers of secondary emitting material 140 incorporated in a second plate 142 spaced forwardly of the end plate 138. These layers serve as transmission dynodes, slowing down the incident electrons in the crystal lattice of the dynode material. The kinetic energy of the electrons is transmitted to secondary emission electrons which leave the emitting surface of the dynode at substantially lower velocities. Therefore, considerably lower potentials on the selecting grid wires 52 are required to prevent passage of electrons therethrough. In addition, the dynode elements 140 provide a useful current amplification.

It will be seen from the foregoing that an improved apparatus for producing high quality character images in visual form is provided by the present invention. The use of the raster scan technique of character generation enables the apparatus to reproduce any shape figure or style of type face with equal facility and without modification of the circuit. The novel character generating device derives video signals representative of the characters to be reproduced from a small scanning pattern compared to the size of the tube, minimizing distortion of the images. Moreover, selection of the image to be reproduced is effected in a purely digital manner and thus is not subjected to the distortion and error inherent in analog types of selecting apparatus.

The scanning action at both the character generating tube and the cathode ray tube is produced by conventional circuit elements which may be readily varied in frequency and amplitude. Therefore, the present apparatus is adaptable to an almost unlimited variety of shapes and sizes of characters to be reproduced and also may readily vary the resolution of the individual characters, i.e., the number of scan lines in which the character is reproduced. This enables a savings in time to be effected, since smaller characters may be adequately reproduced in fewer scan lines than a larger character. In addition, the character matrix may be readily changed to permit variation in type style or character content to be effected. The extreme versatility of the apparatus makes it not only of value in the graphic arts industry for phototypesetting and the like, but also makes it of great advantage where any form of visual display of printed material is required, either to be viewed directly on the face of the cathode ray tube or by projection on an enlarged screen.

It is believed apparent from the foregoing that a great number of variations and modifications in the apparatus of the present invention will occur to those skilled in the art without departing from the spirit and scope thereof. Accordingly, the invention should be limited only as set forth in the appended claims.

We claim:

1. Apparatus for producing an electrical signal representative of a figure to be generated by an output device comprising, means for producing an electron image of the figure to be generated, an electrode having an aperture therein small with respect to the size of said electron image, means for accelerating the electrons forming said image toward said electrode, means for deflecting said electron image in accordance with a predetermined scanning pattern as the electrons accelerate toward said electrode, the size of said aperture relative to said electron image being correlated with said scanning pattern to provide a plurality of sweeps across said electron image during a single complete scan thereof, potential responsive means adjacent said electrode for controlling the flow of electrons of said image through said aperture, means for deriving an output signal from the electrons of said image passing through said aperture, and means coupling said output signal to said output device.

2. Apparatus for producing electrical signals representative of figures to be generated by an output device comprising, means for simultaneously producing electron images of a plurality of figures to be generated, an electrode having a like plurality of apertures therein, the size of said apertures being small relative to their respective electron images, means for accelerating the electrons forming said images toward said electrode, means for deflecting all of said electron images in accordance with the same predetermined scanning pattern as the electrons accelerate toward said electrode whereby streams of electrons corresponding to the electron images flow through the respective apertures, means for deriving an output signal from a selected one of said streams of electrons, and means coupling said output signal to said output device.

3. Apparatus for producing electrical signals representative of fingers to be generated by an output device comprising, means for simultaneously producing electron images of a plurality of figures to be generated, an electrode having a like plurality of apertures therein, the size of said apertures being small relative to their respective electron images, means for accelerating the electrons forming said images toward said electrode, means for deflecting all of said electron images in accordance with a predetermined scanning pattern having an extent on the order of the size of the electron image of a single figure, whereby streams of electrons corresponding to the electron images flow through the respective apertures, voltage responsive means for selecting one of said streams of electrons, means for deriving an output signal from said selected electron stream, and means coupling said output signal to said output device.

4. Apparatus for generating a visual image of a character comprising, means for producing an electron image of the character to be generated, an electrode having an aperture therein small with respect to the size of said electron image, means for accelerating the electrons forming said image toward said electrode, means for deflecting said electron image in accordance with a predetermined scanning pattern as the electrons accelerate toward said electrode, potential responsive means adjacent said electrode for controlling the flow of electrons of said image through said aperture, means for deriving an output signal from the electrons of said image passing through said aperture, a cathode ray tube having an electron beam forming device and a viewing surface, means for deflecting said electron beam over said viewing surface in accordance with said predetermined scanning pattern, and means responsive to said output signal for varying the intensity of the electron beam.

5. Apparatus for generating visual images comprising, means for simultaneously producing electron images of a plurality of characters, an electrode having a like plurality of apertures therein, the size of said apertures being small relative to their respective electron images, means for accelerating the electrons forming said images toward said electrode, means for deflecting all of said electron images in accordance with the same predetermined scanning pattern as the electrons accelerate toward said electrode, whereby streams of electrons corresponding to the electron images flow through the respective apertures, means for deriving output signals from selected ones of said streams of electrons in a desired sequence, a cathode ray tube having an electron beam forming device and a viewing surface, means for deflecting said electron beam over a portion of said viewing surface in accordance with said predetermined scanning pattern, means responsive to the output signals derived from each of said selected streams of electrons for varying the intensity of said electron beam as it is deflected, and means for shifting the portion of said viewing surface over which said electron beam is deflected as different ones of said electron streams are selected.

6. A system for converting the information content of digitally encoded signals into visually readable form comprising, a matrix having imprinted thereon a font of characters, a light source for irradiating said matrix, a light responsive element for receiving the light image from said illuminated matrix and producing an electron image thereof, an electrode having an aperture therein for each character of said font, the aperture being small relative to the electron image of its corresponding character, means for accelerating the electrons forming said images toward said electrode, means for deflecting said electron images in accordance with a predetermined scanning pattern encompassing an area slightly larger than that of the electron image of a single character, whereby streams of electrons corresponding to the electron images flow through their respective apertures, means responsive to the digitally encoded signals for deriving output signals from the streams of electrons corresponding to selected characters of said font in a sequence determined by said digitally encoded signals, a cathode ray tube having an electron beam forming device and a viewing surface, means for deflecting said electron beam over a portion of said viewing surface in accordance with said predetermined scanning pattern, means responsive to the output signals corresponding to each selected character for varying the intensity of said electron beam during a discrete scanning cycle, and means responsive to said digitally encoded signals for shifting the scanning area of said beam to a different portion of said viewing surface during each scanning cycle corresponding to a different selected character, whereby the information content of said encoded signals is reproduced on the viewing surface of the cathode ray tube in readable form.

7. In a system for converting the information content of encoded electrical signals into visually interpretable form, an image generator comprising, an elongated, evacuated chamber, a photocathodic element forming one end wall of said chamber, means to expose the surface of said element exterior of said chamber to an illuminated image of at least one of a plurality of figures, the photocathodic element generating at its interior surface an electron image corresponding to said illuminated image, an anode in said chamber for accelerating said electron image along the chamber and having a surface thereof disposed transversely of the path of said electron image, a separate aperture in said transverse surface corresponding to each of said plurality of figures and small in size relative thereto, means for deflecting the electron image in accordance with a predetermined scanning pattern, and means responsive to said electrical signals for collecting the electrons flowing through one of said apertures at a time to derive an output signal corresponding to the figure associated with said one of said apertures.

8. In a system for converting the information content of encoded electrical signals into visually interpretable form, an image generator comprising, an elongated, evacuated chamber, a photocathodic element forming one end wall of said chamber, a generally opaque matrix having a font of relatively transparent characters imprinted thereon, means releasably supporting said matrix closely adjacent the surface of said photocathodic element exterior of said chamber, illuminating means for casting a light image of at least one character of said font of characters at a time on said exterior surface of said element, the element generating at its interior surface an electron image corresponding to said illuminated image, an anode in said chamber for accelerating said electron image along the chamber and having a surface thereof disposed transversely of the path of said electron image, a separate aperture in said transverse surface corresponding to each character of said font and small in size relative thereto, means for deflecting the electron image in accordance with a predetermined scanning pattern, and means responsive to said encoded electrical signals for selecting electrons from said image flowing through only one of said apertures at a time to derive an output signal corresponding to the character associated with said selected aperture.

9. A character generator according to claim 8 wherein said illuminating means casts a light image of said entire font of characters at one time on the exterior surface of said photocathodic element.

10. A character generator according to claim 8 wherein said illuminating means comprises means for providing a light beam capable of illuminating substantially only one character at a time, and wherein there is further provided means synchronized with said selecting means to deflect the light beam to illuminate the character corresponding to the selected aperture.

11. In a system for converting the information content of encoded electrical signals into visually interpretable form, an image generator comprising, an elongated, evacuated chamber, a photocathodic element forming one end wall of said chamber, said element generating at its interior surface an electron image corresponding to an illuminated image directed against its exterior surface, an anode in said chamber for accelerating said electron image along the chamber and having a surface thereof disposed transversely of the path of said electron image, a plurality of spaced apertures in said transverse surface corresponding to respective portions of said electron image and small in size relative thereto, means for deflecting the electron image in accordance with a predetermined scanning pattern, a selecting grid composed of orthogonally related conductors disposed substantially parallel to said transverse surface and having an intersection thereof adjacent each said aperture, means for coupling selecting potentials to one pair of intersecting conductors at a time to enable electrons flowing through the corresponding aperture to pass through said grid, and means to collect said electrons to derive an output signal.

12. A character generator according to claim 11 wherein said means to collect said electrons comprises an electron multiplier.

13. In a system for converting the information content of encoded electrical signals into visually interpretable form, an image generator comprising, an elongated, evacuated chamber, a photocathodic element forming one end wall of said chamber, said element generating at its interior surface an electron image corresponding to an illuminated image directed against its exterior surface, an anode in said chamber for accelerating said electron image along the chamber and having a surface thereof disposed transversely of the path of said electron image, a plurality of spaced apertures in said transverse surface corresponding to respective portions of said electron image and small in size relative thereto, means for deflecting the electron image in accordance with a predetermined scanning pattern, a secondary emissive layer disposed opposite each of said apertures to intercept the electrons flowing therethrough and provide an increased number of slower moving electrons, a selecting grid composed of orthogonally related conductors disposed substantially parallel to said transverse surface and adjacent said secondary emissive layers, an intersection of said grid conductors being disposed opposite each of said apertures, means for coupling selecting potentials to one pair of intersecting conductors at a time to enable the slow moving electrons from the secondary emissive layer corresponding to the selected aperture to pass through said grid, and means to collect said electrons to derive an output signal.

14. In a system for converting the information content of encoded electrical signals into visually interpretable form, an image generator comprising, an elongated, evacuated chamber, a photocathodic element forming one end wall of said chamber, said element generating at its interior surface an electron image corresponding to an illuminated image directed against its exterior surface, anode structure in said chamber for accelerating said electron image along the chamber and having a pair of spaced, generally parallel surfaces disposed transversely of the path of said electron image, a plurality of pairs of aligned apertures in said pair of transverse surfaces corresponding to respective portions of said electron image and small in size relative thereto, means for deflecting the electron image in accordance with predetermined scanning pattern, a selecting grid composed of orthogonally related conductors disposed substantially parallel to and between said transverse surfaces, an intersection of said grid conductors being disposed adjacent each pair of aligned apertures in said transverse surfaces, means for coupling selecting potentials to one pair of intersecting conductors at a time to enable electrons from said image to flow through both of the corresponding aligned apertures and to all of the other conductors to deflect the electrons from passing through the second opening of the respective aligned pairs, and means to collect the electrons flowing through the selected aligned pair of apertures to derive an output signal.

15. Apparatus for producing an electrical signal representative of a figure to be generated by an output device comprising, a matrix having the figure to be generated appearing thereon, a source of radiant energy for irradiating said matrix, means responsive to said radiant energy after irradiation of said matrix to produce an electron image of said figure, an electrode having an aperture therein small with respect to the size of said electron image, means for accelerating the electrons forming said image toward said electrode, means for deflecting said electron image in accordance with a predetermined scanning pattern as the electrons accelerate toward said electrode, potential responsive means adjacent said electrode for controlling the flow of electrons of said image through said aperture, means for deriving an output signal from the electrons passing through said aperture, and means coupling said output signal to said output device.

16. Apparatus according to claim 15 wherein the size of said aperture relative to said electron image and said scanning pattern is correlated to provide a plurality of sweeps across said electron image during a single complete scan thereof.

References Cited by the Examiner

UNITED STATES PATENTS

| | | | |
|---|---|---|---|
| 2,761,988 | 9/1956 | McNaney | 313—69 |
| 2,862,144 | 11/1958 | McNaney | 315—30 |
| 2,875,370 | 2/1959 | Young et al. | 315—10 |
| 2,920,441 | 1/1960 | Beurrier | 315—30 |
| 3,020,441 | 2/1962 | Hamann | 315—8 |
| 3,181,026 | 4/1965 | Sloan | 315—8 |

NEIL C. READ, *Primary Examiner.*

A. J. KASPER, *Assistant Examiner.*